(12) United States Patent
Witzens et al.

(10) Patent No.: US 7,613,369 B2
(45) Date of Patent: Nov. 3, 2009

(54) DESIGN OF CMOS INTEGRATED GERMANIUM PHOTODIODES

(75) Inventors: Jeremy Witzens, Del Mar, CA (US); Gianlorenzo Masini, Carlsbad, CA (US); Giovanni Capellini, Rome (IT); Lawrence C. Gunn, III, Encinitas, CA (US)

(73) Assignee: Luxtera, Inc., Carlsbad, CA (US)

( * ) Notice: Subject to any disclaimer, the term of this patent is extended or adjusted under 35 U.S.C. 154(b) by 15 days.

(21) Appl. No.: 11/735,251

(22) Filed: Apr. 13, 2007

(65) Prior Publication Data

US 2008/0193076 A1   Aug. 14, 2008

Related U.S. Application Data

(60) Provisional application No. 60/791,867, filed on Apr. 13, 2006.

(51) Int. Cl.
  *G02B 6/12* (2006.01)
(52) U.S. Cl. .............................. 385/14; 385/15; 372/94; 65/385; 257/E21.578
(58) Field of Classification Search .................. 385/14, 385/15; 372/94; 65/385; 257/E21.578
See application file for complete search history.

(56) References Cited

U.S. PATENT DOCUMENTS 7,306,997 B2 * 12/2007 Xiang et al. ................ 438/300

2004/0188794 A1 * 9/2004 Gothoskar et al. .......... 257/459
2006/0001089 A1 * 1/2006 Bedell et al. ................ 257/347

* cited by examiner

*Primary Examiner*—Ellen Kim
(74) *Attorney, Agent, or Firm*—McAndrews Held & Malloy, Ltd.

(57) ABSTRACT

A CMOS processing compatible germanium on silicon integrated waveguide photodiode. Positioning contacts in predicted low optical field regions, establishing side trenches in the silicon layer along the length of the photodiode reduces optical losses. Novel taper dimensions are selected based on the desirability of expected operational modes, reducing optical losses when light is injected from the silicon layer to the germanium layer. Reduced vertical mismatch systems have improved coupling between waveguide and photodiode. Light is coupled into and/or out of a novel silicon ring resonator and integrated waveguide photodiode system with reduced optical losses by careful design of the geometry of the optical path. An integrated waveguide photodiode with a reflector enables transmitted light to reflect back through the integrated waveguide photodiode, improving sensitivity. Careful selection of the dimensions of a novel integrated waveguide microdisk photodiode system results in reduced scattering. Improved sensitivity integrated waveguide photodiodes comprise integrated heaters.

38 Claims, 20 Drawing Sheets

| Etch depth | Coupling into mode 1 | Overlap of mode 1 with Ge |
|---|---|---|
| 0 nm etch | 40% | 75% |
| 25 nm etch | 47.2% | 76% |
| 50 nm etch | 65.4% | 77% |
| 100 nm etch | 71.8% | 79% |

Table 1

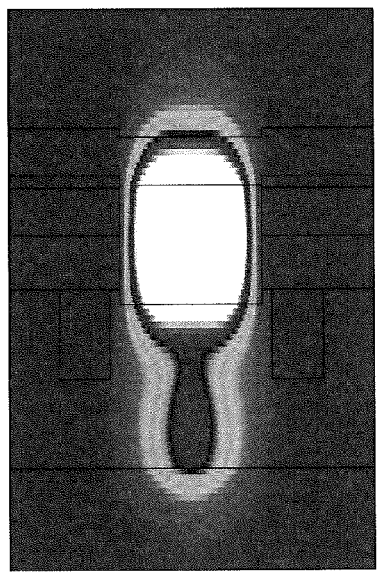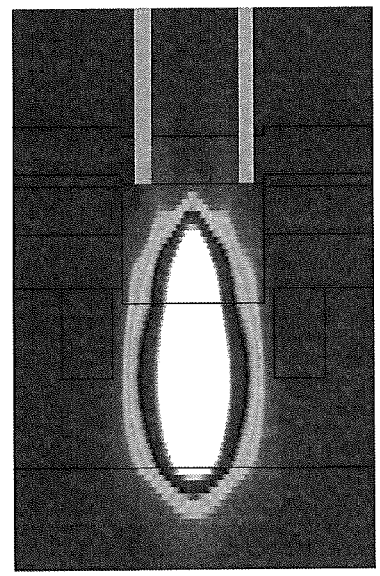
Figure 7a                              Figure 7b

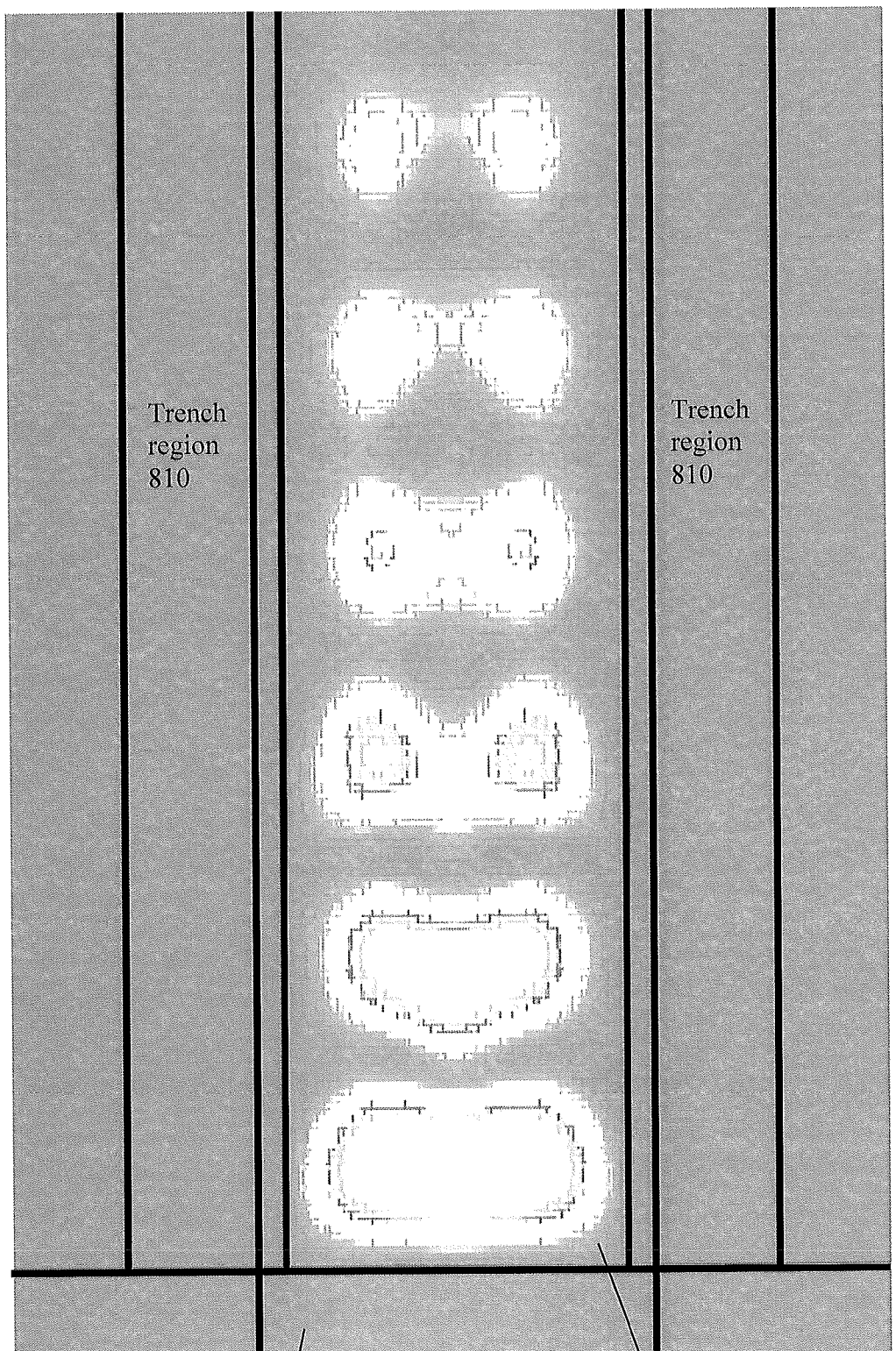
Figure 8   Silicon Waveguide 801   Germanium Layer of WPD 802

DESIGN OF CMOS INTEGRATED GERMANIUM PHOTODIODES

CROSS-REFERENCE TO RELATED APPLICATIONS

This application is a conversion of and claims priority from U.S. Provisional application No. 60/791,867 entitled "Design of CMOS Integrated Germanium Photodiodes", filed on Apr. 13, 2006, herein incorporated by reference.

FIELD OF INVENTION

Invention relates to the design and manufacture of optical devices, specifically to integrated waveguide photodiodes.

BACKGROUND OF INVENTION

The rapid expansion in the use of the Internet has resulted in a demand for high speed communications links and devices, including optical links and devices. Optical links using fiber optics have many advantages compared to electrical links: large bandwidth, high noise immunity, reduced power dissipation and minimal crosstalk. Optoelectronic integrated circuits made of silicon are highly desirable since they could be fabricated in the same foundries used to make VLSI integrated circuits. Optical communications technology is typically operating in the 1.3 µm and 1.55 µm infrared wavelength bands. The optical properties of silicon are well suited for the transmission of optical signals, due to its transparency in the infrared wavelength bands of 1.3 µm and 1.55 µm and its high refractive index. As a result, low loss planar silicon optical waveguides have been successfully built.

A silicon based waveguide is just one of many components needed to make an integrated optoelectronic circuit. An optical signal received by an optoelectronic circuit has in many cases to be converted to an electronic signal for further processing by electronic circuits. Conversion of optical signals to electronic signals can be achieved by a photodiode. Silicon, due to its bandgap of 1.12 eV, cannot be used to make photodiodes for infrared band signals, because it is transparent to light at wavelengths above 1.1 µm. Silicon's transparency to infrared light makes it ideal for use as a planar waveguide on an integrated circuit, but eliminates it from use as an infrared photodiode. However, germanium can be used in an infrared diode and may be incorporated into a germanium on silicon integrated waveguide photodiode. However, in many cases, large optical losses due to scattering may be incurred when light is transmitted from the silicon layer to the germanium layer of a germanium on silicon integrated waveguide photodiode, leading to signal reduction.

For some applications, it would be advantageous to optimize various characteristics of photodiode devices. Examples of important characteristics include, but are not limited to, the capacitance of the photodiode device, the dark current of the waveguide photodiode devices and/or system noise. In some cases, reducing the length and/or footprint of the photodiode may improve these characteristics; however, for many current photodiode system designs, reducing photodiode length and/or footprint may result in poor responsivity and/or loss of sensitivity. Mechanisms for improving the coupling of light into the photodiode device would be useful for addressing some of these issues.

Reducing the length of a waveguide photodiode could reduce its capacitance. Similarly, reducing the footprint of a photodiode could also reduce the dark current of the waveguide photodiode, possibly enabling lower noise operation and higher device density. However, many current photodiode designs lose responsivity and/or sensitivity when their size and/or length are reduced.

For many applications it would be beneficial to minimize the capacitance of the germanium on silicon waveguide photodiode. For example, in some cases, a transimpedance amplifier with a larger feedback resistor may be used to amplify the photocurrent in a reduced capacitance waveguide photodiode; in this configuration, better noise performance may be achieved while maintaining the overall bandwidth of the waveguide photodiode plus transimpedance amplifier subsystem. If it were possible to reduce the capacitance of a waveguide photodiode, the power consumption of the transimpedance amplifier could possibly be reduced. A reduced capacitance photodiode system might enable the use of other non-conventional transimpedance architectures.

Optical loss mechanisms limit the maximum fraction of the light that can be absorbed by a germanium on silicon waveguide photodiode. Examples of these loss mechanisms include, but are not limited to, absorption and scattering by the electrodes, optical leakage of the waveguide photodiode modes and surface roughness of the germanium stripe. These optical loss mechanisms compete with the absorption by the germanium. It would be advantageous to reduce the effect of these optical loss mechanisms by improving the overlap of light with the germanium layer.

In some cases, a mode matching mechanism such as an adiabatic taper defined in the germanium layer may be used to increase the overlap of the light with the germanium when light is injected from a silicon waveguide to the germanium on silicon waveguide photodiode. The use of an adiabatic taper of the germanium layer may result in a device with adequate responsivity, but can introduce limitations such as, but not limited to, increased device capacitance and device footprint. Furthermore, some features of an adiabatic taper can be difficult to manufacture such as, but not limited to, the very narrow and sharp feature at the beginning of an adiabatic taper; manufacturing difficulties may be due, at least in part, to limited lithography resolution and/or to limitations associated with selective germanium epitaxy processes and/or selective germanium removal processes. In some cases, these constraints may be captured by design rules that limit minimum dimensions and exclude certain geometries from design. Breaking these design rules can result in poor yields and/or unmanufacturable devices. What is needed is a way to design and implement a germanium on silicon integrated waveguide photodiode in a way that provides adequate sensitivity and responsivity with an acceptable device capacitance and a manufacturable geometry. Furthermore, device density considerations may make the use of adiabatic tapers unattractive for some applications; a more compact, but functional integrated silicon/silicon and germanium waveguide photodetector would be attractive for some applications.

Furthermore, other improvements to germanium on silicon integrated waveguide photodiode would be valuable such as, but not limited to, reducing optical losses from other sources such as scattering or absorption related to the electrical contacts on the germanium layer and lateral light leakage in the silicon layer.

SUMMARY OF INVENTION

The current invention is an improved integrated waveguide photodiode. According to the current invention, optical losses associated with contacts to the germanium layer of the silicon and germanium photodiode are reduced by positioning the contacts in proximity to predicted low optical field regions at the top surface of the germanium layer. In some cases, the low optical field regions may be predicted based on modeling and/or experimental data. In some examples according to the current invention, careful contact positioning may result in reduced optical scattering losses and/or optical absorption losses associated with the contacts. Reduced optical losses may result in more sensitive and/or less noisy devices. In some cases, design rules may be altered to incorporate the reduced optical losses and smaller and/or more compact devices may be designed and/or manufactured.

According to the current invention, lateral confinement of light in the silicon layer of the silicon and germanium photodiode may be improved and optical losses may be reduced by establishing side trenches along at least some portion of the length of the photodiode. In depth, the side trenches extend at least partially into the silicon layer; in length, the side trenches are adjacent to the germanium detector. In some cases, the trenches may be substantially parallel to the edge of the germanium layer in the photodiode. In some cases, the trenches may vary in width. For example, in some examples according to the current invention, trenches may be used in conjunction with a tapered germanium layer. In some cases, the trench edges closest to the tapered germanium layer may be substantially parallel to the edge of the tapered germanium layer, whereas the far edges of the trenches may or may not be parallel to the tapered germanium layer. In some cases, the side trenches are filled with a dielectric material such as, but not limited to, a silicon-oxi-nitride ($SiO_xN_y$) dielectric. Reduced optical losses in the silicon layer of the silicon and germanium photodiode portion of the integrated waveguide photodiode may enable more efficient coupling of optical power from the silicon layer to the germanium layer, possibly resulting in more sensitive and/or less noisy devices. In some cases, design rules may be altered to incorporate the reduced optical losses and smaller and/or more compact devices may be designed and/or manufactured.

According to the current invention, a novel taper structure may be used to reduce optical losses when light is injected from the silicon layer to the germanium layer of a germanium on silicon integrated waveguide photodiode. For some examples of the current invention, the novel taper structure may be used to increase the overlap of the light with the germanium, to reduce the length of the waveguide photodiode while maintaining responsivity, and/or to reduce the detrimental impact of other loss mechanisms. According to the current invention, the geometry of a taper in the germanium layer of the silicon and germanium photodiode is selected at least in part based on the desirability of the expected operational modes for a multimode system. Preferred geometries would support modes which anti-cross, converting unattractive modes into attractive modes. For example, an attractive mode might have a high overlap with the germanium layer, thereby improving the absorption in the germanium layer which may lead to attractive device characteristics. In some cases, different and/or additional considerations may be used to identify attractive modes such as, but not limited to, identifying modes which are "non-leaky" or have good lateral confinement. Modal analysis based on proposed geometries, coupling coefficients from the silicon waveguide into the integrated waveguide photodiode, and/or the effective indices of predicted dominant modes may be used, at least in part, to guide the design of a novel taper. According to the current invention, modal analysis may be used to identify an appropriate initial taper width, an intermediate taper width, a taper grade, a final taper width and/or a taper length. In some cases, other considerations may be used to identify appropriate taper parameters such as, but not limited to, device capacitance considerations and/or manufacturing constraints related to germanium thickness control, minimum feature size and/or manufacturable feature shape.

According to the current invention, coupling between the silicon waveguide and the integrated waveguide photodiode may be improved by reducing the vertical mismatch between the silicon waveguide and the germanium layer of the integrated waveguide photodiode. In some cases, this may be achieved by etching some portion of the silicon located directly below the germanium, thereby reducing the vertical mismatch of the germanium stripe with respect to the silicon waveguide.

According to the current invention, a novel silicon ring resonator and integrated waveguide photodiode system may be used to enable at least some light coupled into the silicon ring resonator to pass through the integrated waveguide photodiode more than one time. According to the current invention, a silicon ring resonator is formed from the top silicon layer of a silicon-on-insulator (SOI) substrate. In some cases, the ring resonator may comprise a substantially circular, oval or racetrack shape. An integrated waveguide photodiode is integrated with and optically coupled to the silicon ring resonator. According to the current invention, the silicon layer of the integrated waveguide photodiode comprises a portion of the silicon layer of the silicon ring resonator, thereby integrating the integrated waveguide photodiode with a portion of the silicon ring resonator. The integrated waveguide photodiode further comprises a germanium layer comprising substantially germanium for converting light into photocurrent, disposed on top of the silicon layer. In some cases, this may enable the design and manufacture of small integrated waveguide photodiodes. For example, in some cases this may enable the design and manufacture of detectors with an extremely small germanium footprint, thus enabling the design and manufacture of detectors with extremely small capacitance.

According to an example of the current invention, a novel silicon ring resonator and integrated waveguide photodiode system couples light into and/or out of the silicon ring resonator with reduced optical losses. According to the current invention, the geometry of the optical path is carefully selected to reduce optical losses associated with coupling light into and/or out of a ring resonator structure. In some cases, the geometry of the optical path and/or the overall length of the integrated waveguide photodiode system is also carefully selected to support exciting specific predicted optical modes.

According to an example of the current invention, a novel integrated waveguide photodiode system comprises a reflector disposed at the end of the integrated waveguide photodiode. In some examples, the reflector structure may enable light to be transmitted by the integrated waveguide photodiode to reflect back through the integrated waveguide photodiode, thereby improving sensitivity and/or enabling the design of shorter integrated waveguide photodiodes. In some cases, the reflector may be implemented as a Sagnac loop.

According to an example of the current invention, a novel integrated waveguide microdisk photodiode system enables light to travel around an integrated waveguide photodiode microdisk at least twice. In some cases, resonance and/or scattering is substantially suppressed between light inserted into the system at the insertion point, light traveling around the optical path the first time and light traveling around the optical path the second time, due at least in part to the selected dimensions of the optical path. In some cases, the dimensions of the system may be selected to substantially inhibit light from coupling back into the waveguide at the insertion point after traveling around the optical path once when under operation.

According to the current invention, the sensitivity of an integrated waveguide photodiode may be improved with novel heaters. In some examples, at least one heater is integrated on the substrate, in proximity to the germanium layer of the integrated waveguide photodiode for increasing the operational temperature of the germanium layer. For example, in some cases, this may result in germanium band gap reduction when in operation, resulting in enhancement of the absorption coefficient of the germanium, thereby improving the sensitivity of the integrated waveguide photodiode.

According to the current invention, in some cases, one or more of the various aspects of the current invention (the novel taper structure, the novel sidewall structure, the reduced vertical mismatch structure, the novel heaters, the ring resonator structure, the microdisk structure, the reflector structure and/or the novel electrode placement) may be used separately or in combination. In some cases, one or more of the various aspects of the current invention (the novel taper structure, the novel sidewall structure, the reduced vertical mismatch structure, the novel heaters, the reflector structure and/or the novel electrode placement) may be used separately or in conjunction with an integrated waveguide photodiode coupled to two waveguides, one silicon waveguide coupled to each end of the integrated waveguide photodiode. Advantageously, the current invention may be compatible with CMOS processing.

BRIEF DESCRIPTION OF DRAWINGS AND TABLES

Table 1 shows the dependency of the coupling coefficient from the silicon waveguide into mode 1 of the WPD, as well as of the confinement of mode 1 into the germanium, as a function of the dielectric window over-etch.

Figure 6:
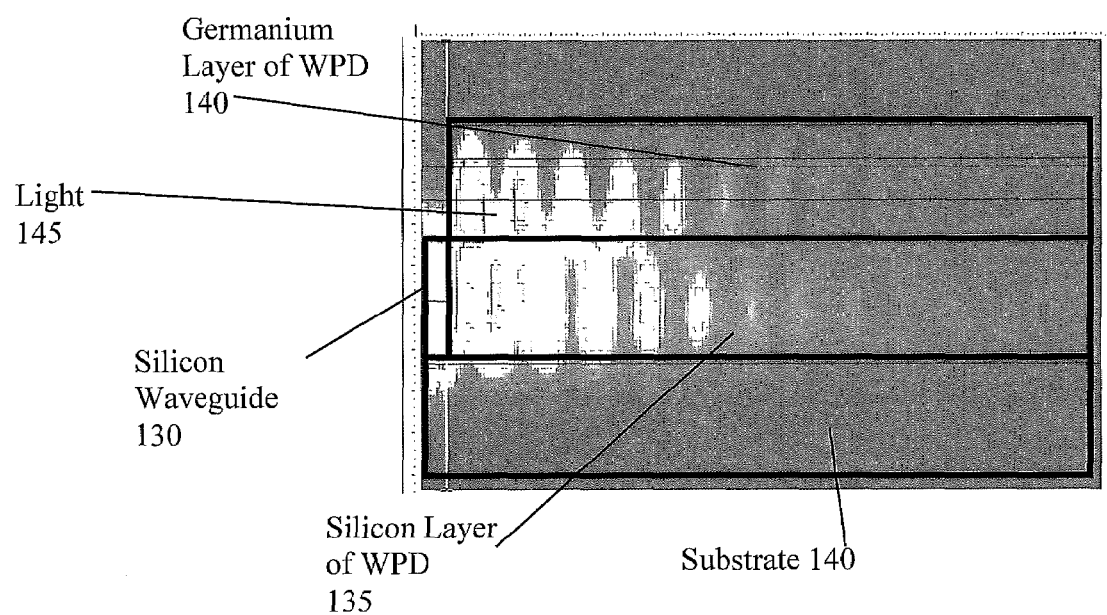

FIG. 6 illustrates a field profile along the longitudinal cross-section of a WPD parallel to the light propagation path.

FIG. 7a illustrates a field cross-section where the field is in the germanium.

FIG. 7b illustrates a field cross-section where the field is in the silicon.

FIG. 8 illustrates the field profile at the top of the germanium strip.

Figure 9A:
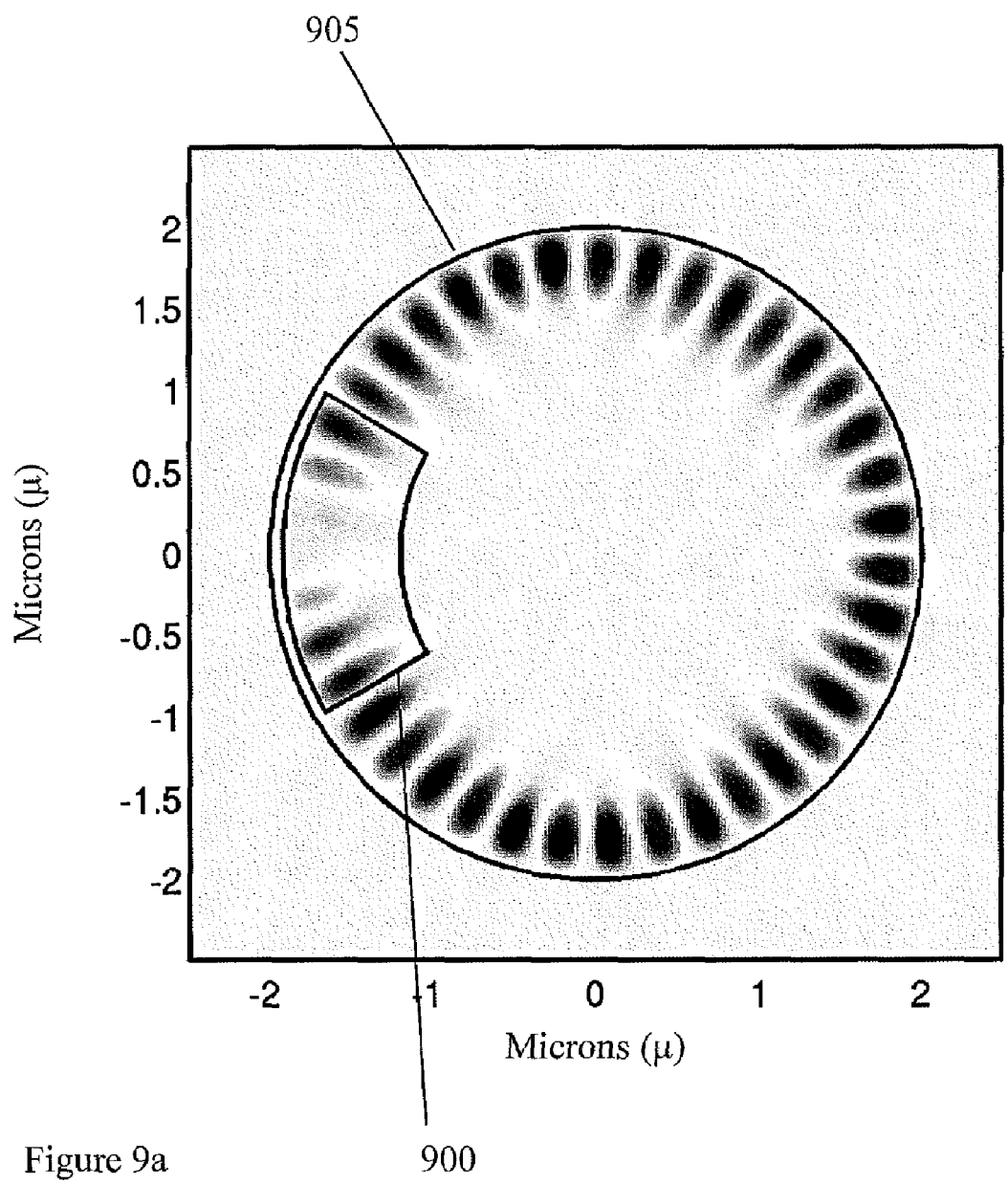
Figure 9B:
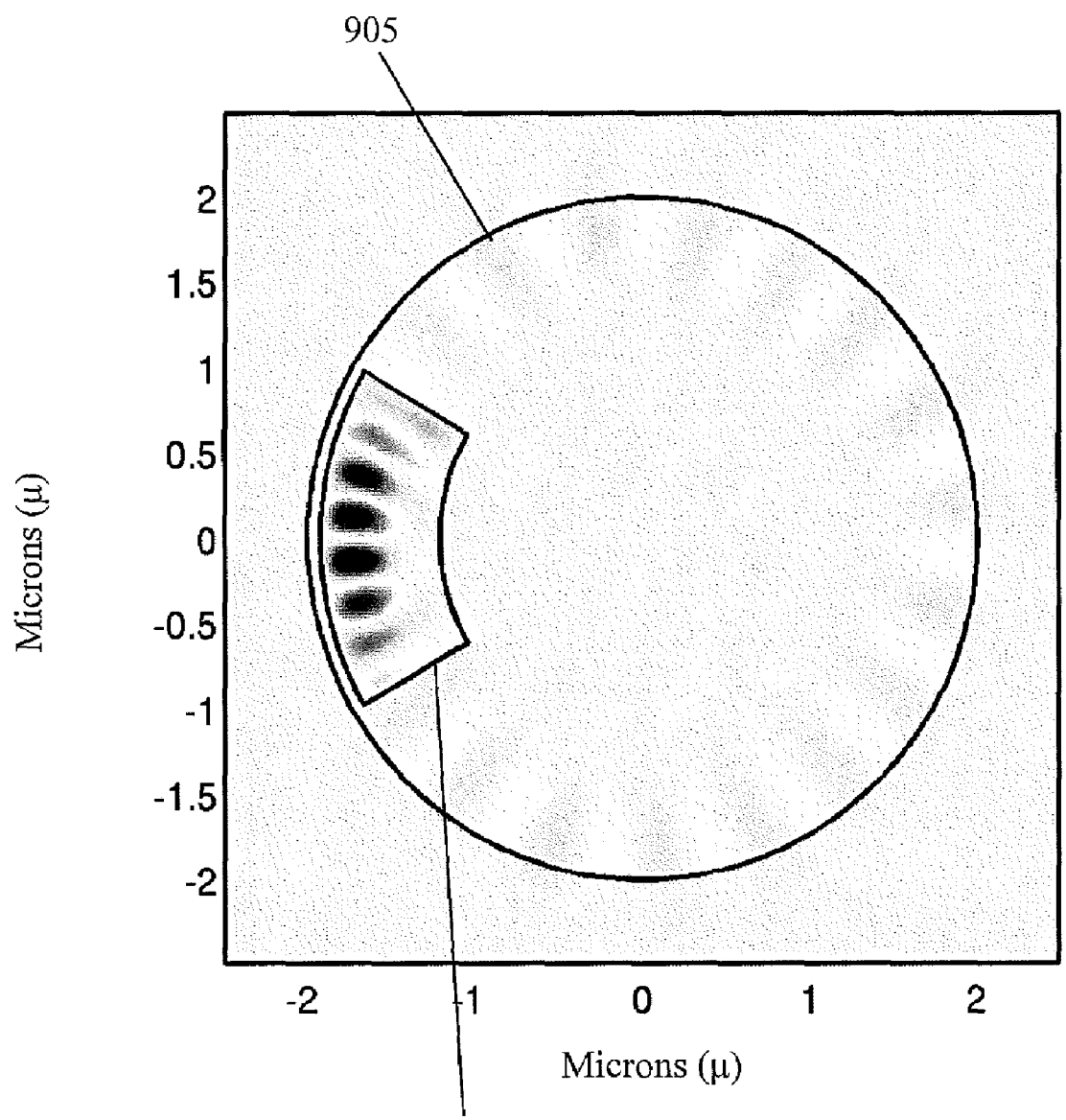

FIGS. 9a and 9b illustrate field cross-sections of a microdisk (2-micron radius) with a germanium photodiode.

Figure 10:
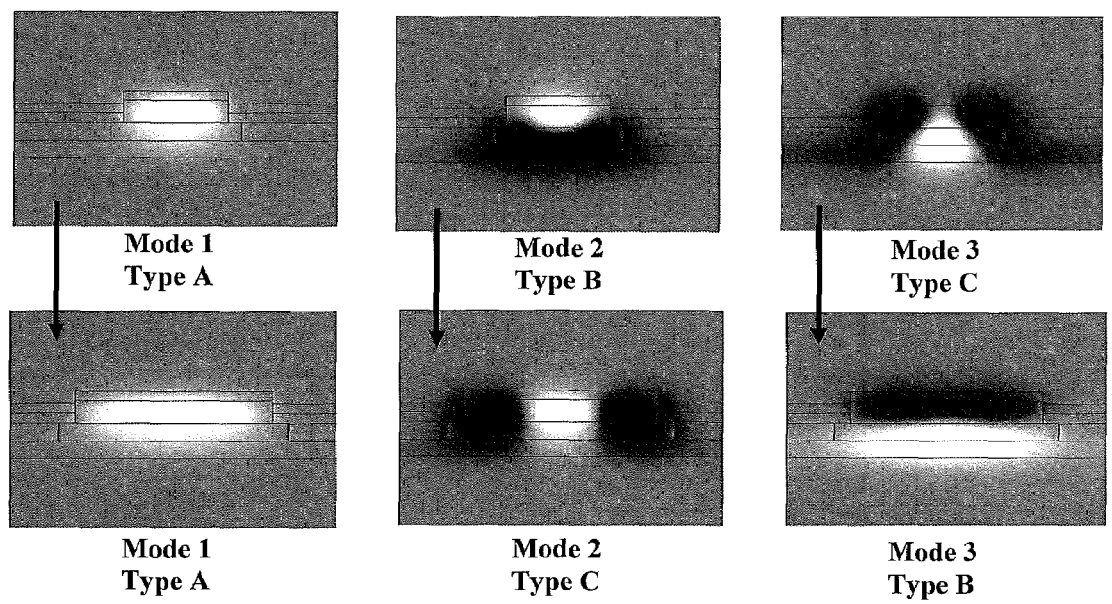

FIG. 10 shows the 3 relevant modes for a WPD with an 800 nm wide germanium strip (upper line) and a 1200 nm wide WPD (lower line).

Figure 11:
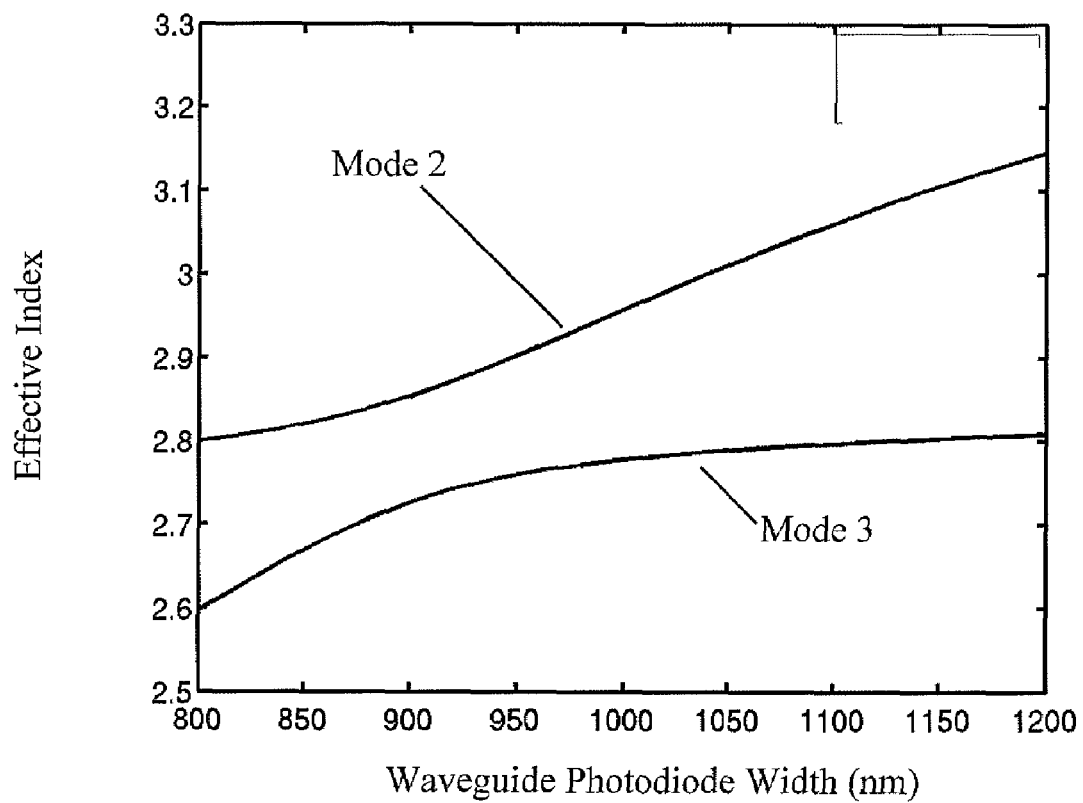

FIG. 11 illustrates the effective indices of modes 2 and 3 as a function of waveguide width (nm).

Figure 12:
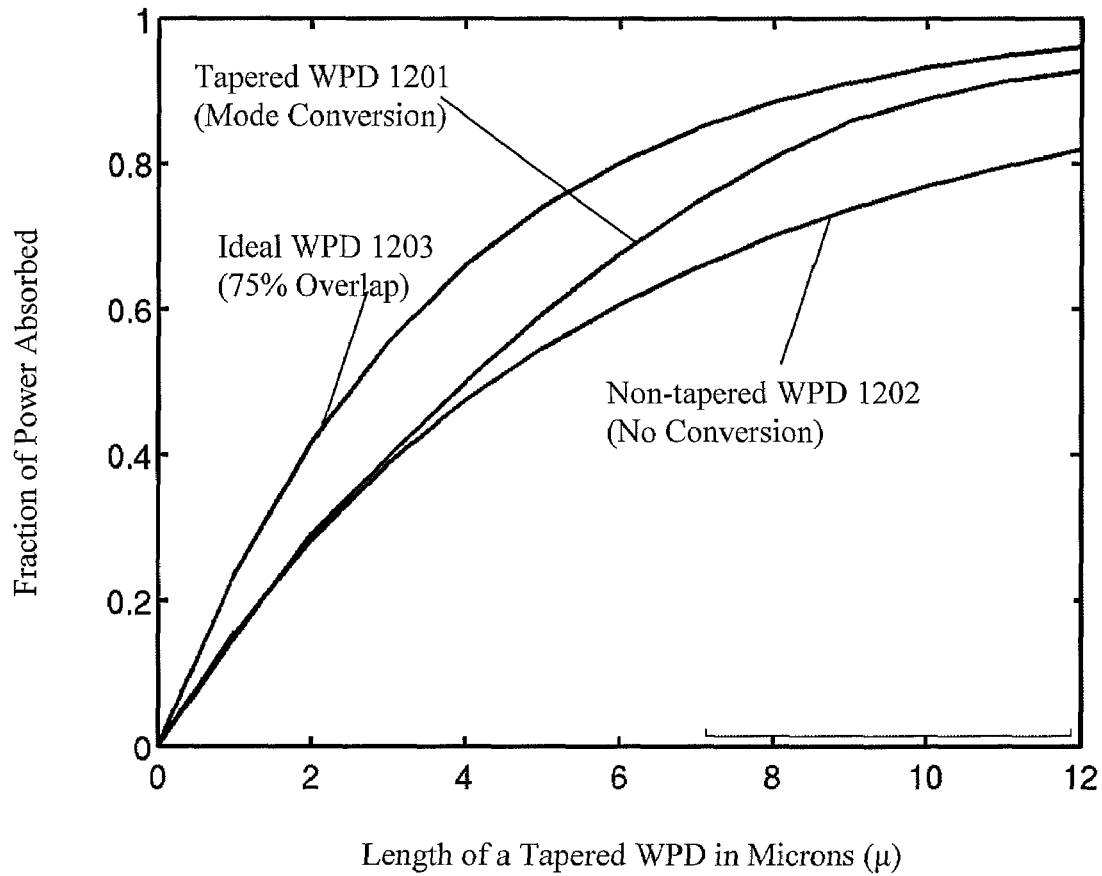

FIG. 12 illustrates a comparison of a tapered WPD with a non-tapered WPD and the ideal case of a WPD where all the power is coupled into mode 1 at the beginning of the WPD.

Figure 13:
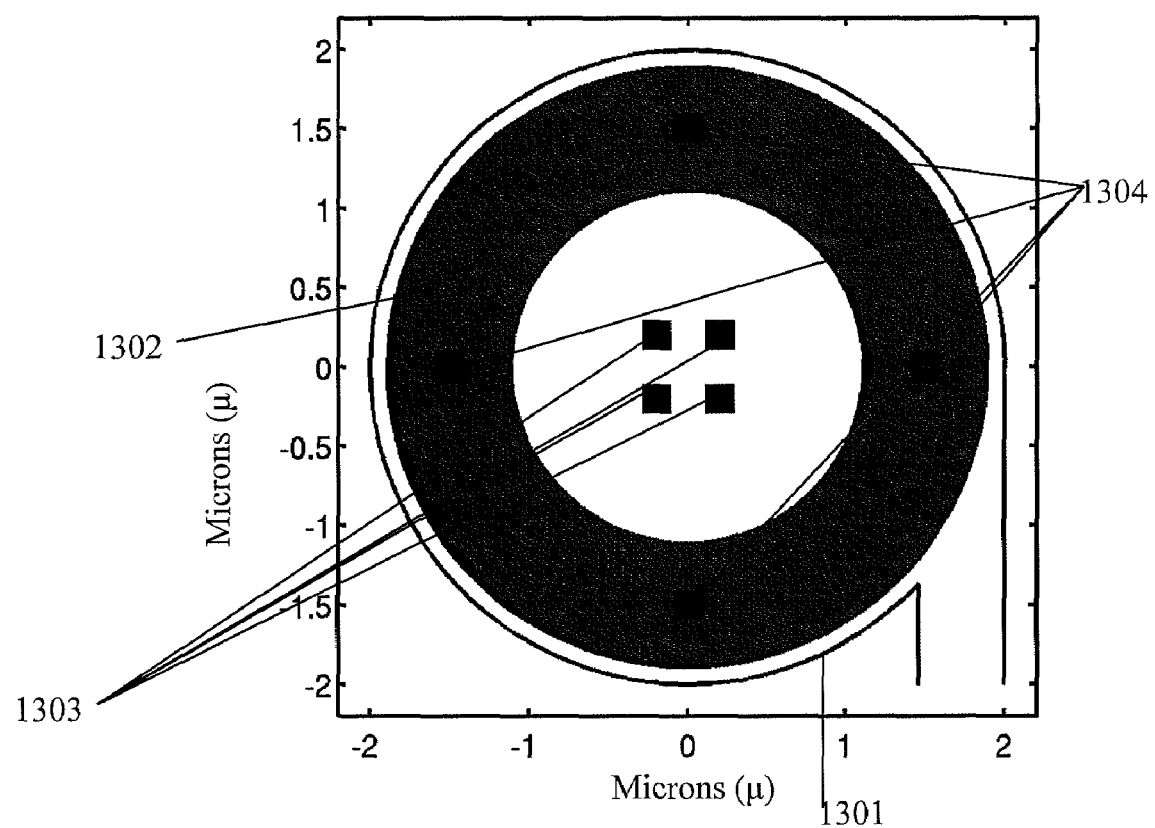

FIG. 13 illustrates a Micro-Disk Photodiode (MDP).

Figure 14A:
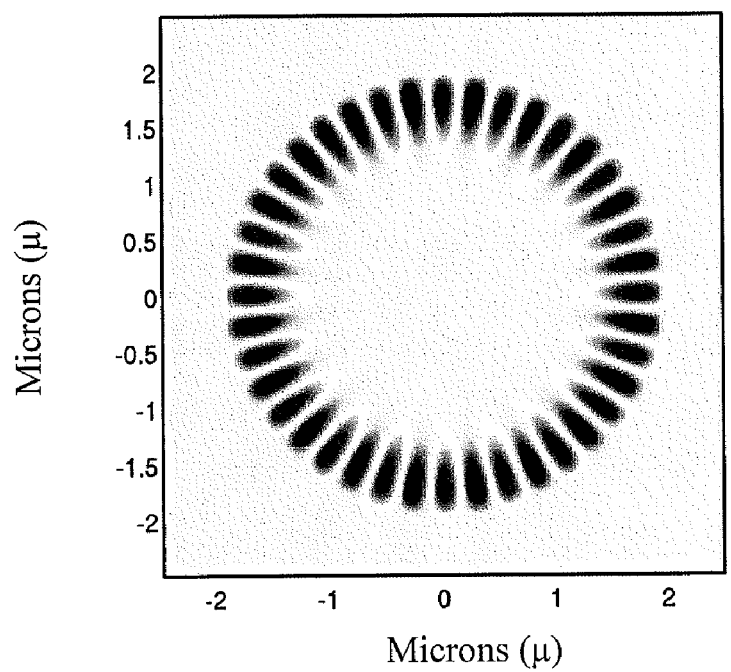

FIGS. 14a and b illustrate two modes of the micro-disk.

Figure 14B:
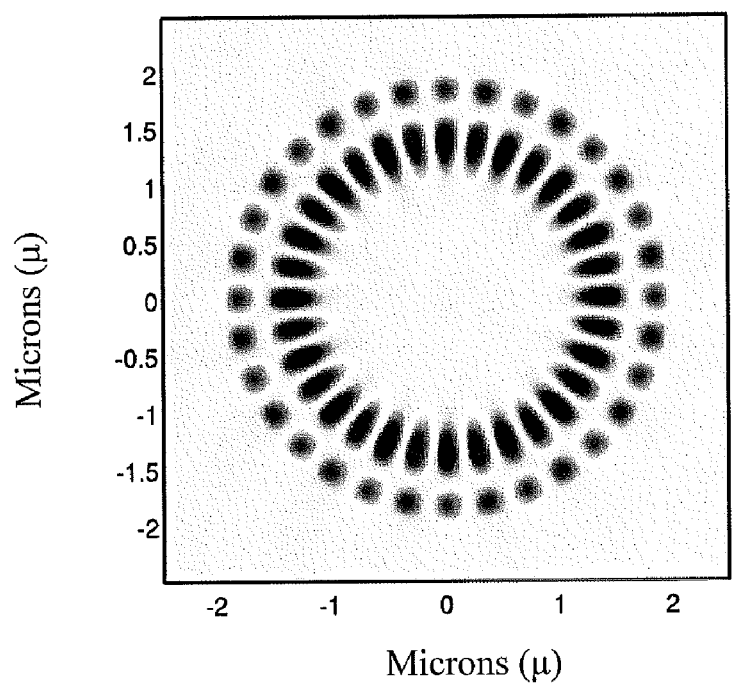
Figure 15A:
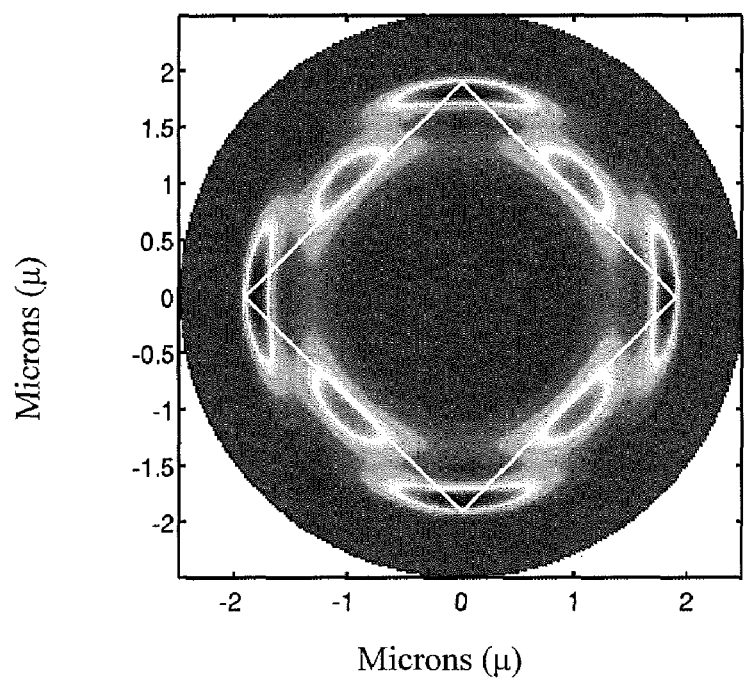

FIG. 15a illustrates the field in the micro-disk (magnitude) when the two modes shown in FIG. 14 undergo an integer number of beating lengths.

Figure 15B:
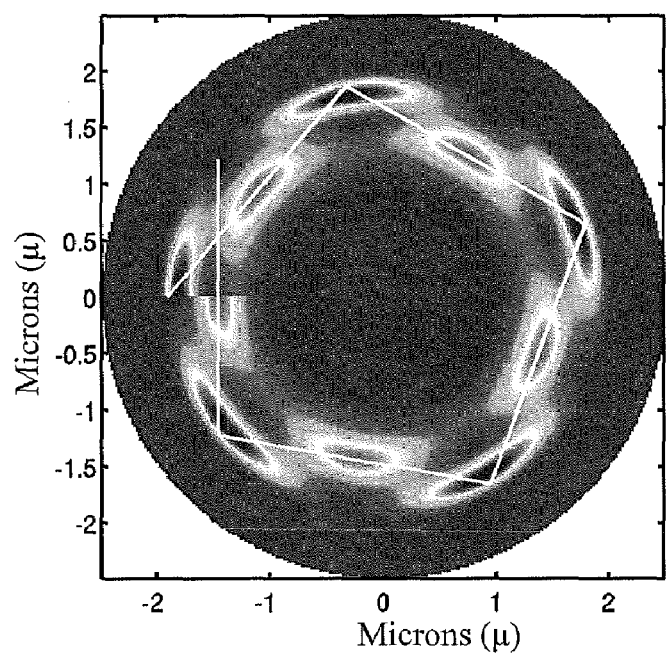

FIG. 15b illustrates the situation where the field undergoes N+½ beating lengths, where N is an integer (4 in this case).

Figure 16A:
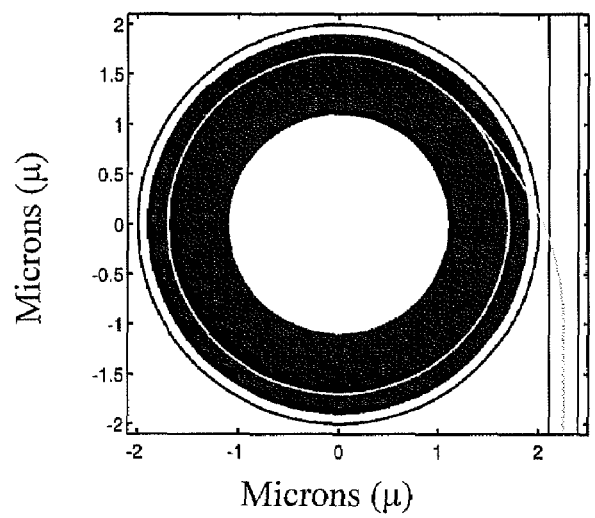

FIG. 16a illustrates a critically coupled MDP.

Figure 16B:
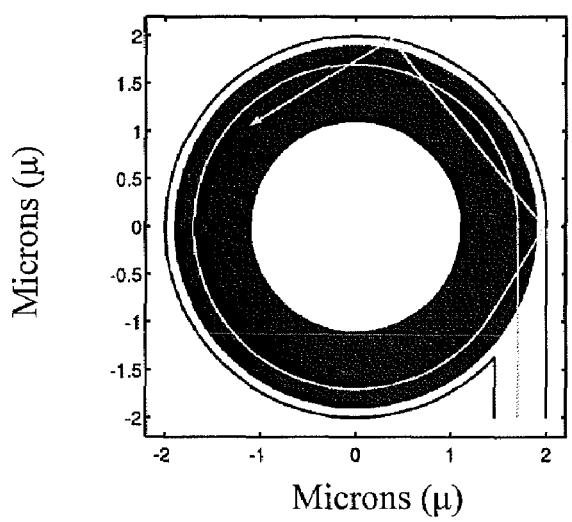

FIG. 16b illustrates a "butt-coupled" MDP.

Figure 17B:
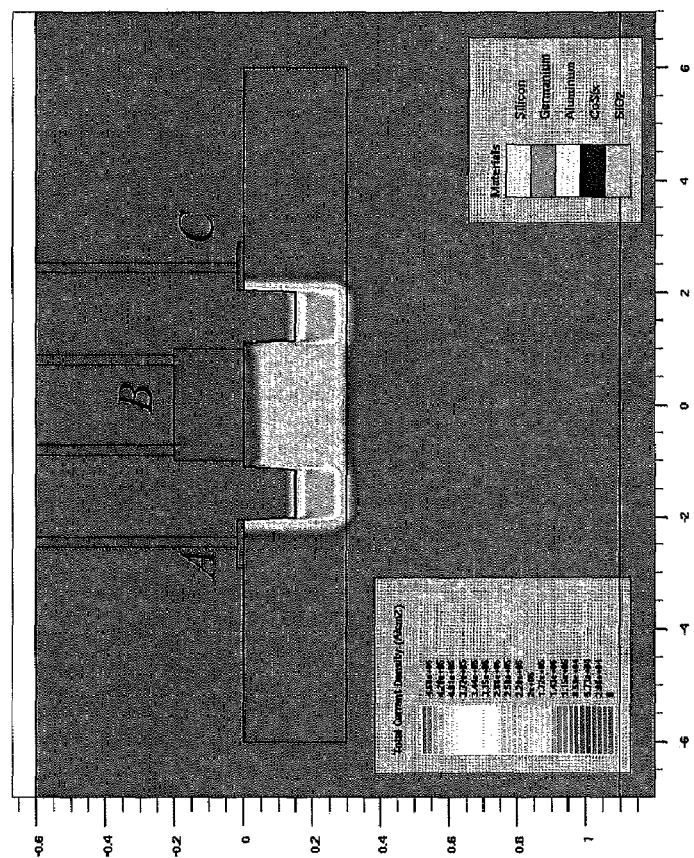
Figure 17A:
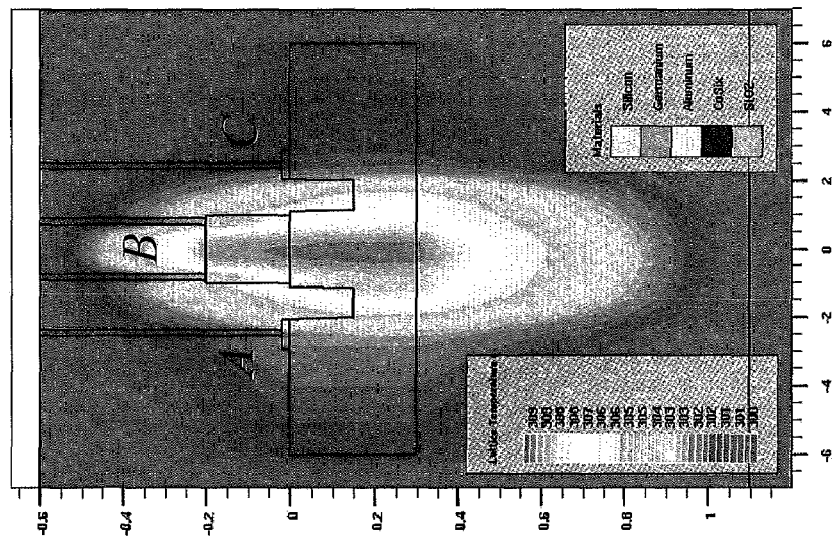

FIG. 17a illustrates the thermal distribution for an example of a heated photodiode according to the current invention.

FIG. 17b illustrates the current associated with the heater for an example of a heated photodiode according to the current invention.

Figure 18B:
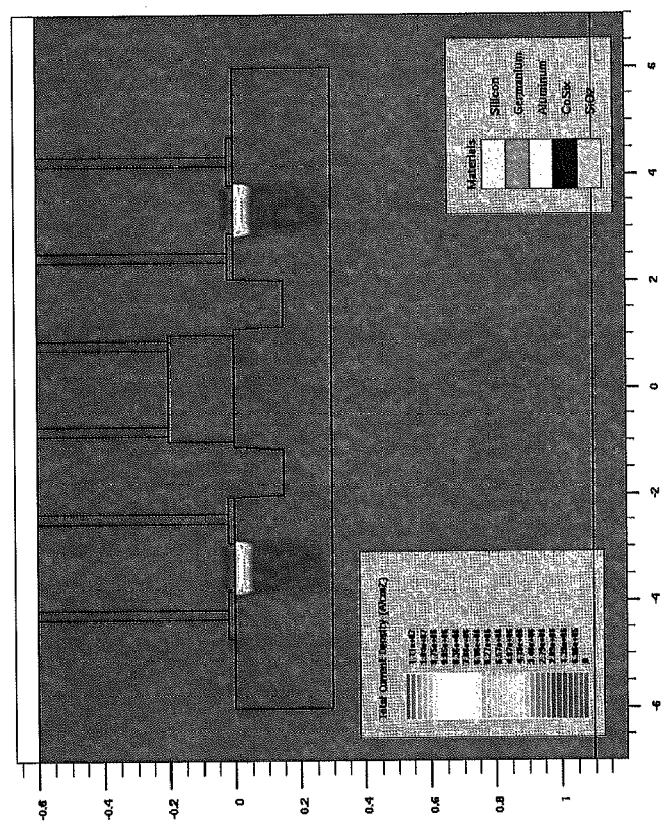
Figure 18A:
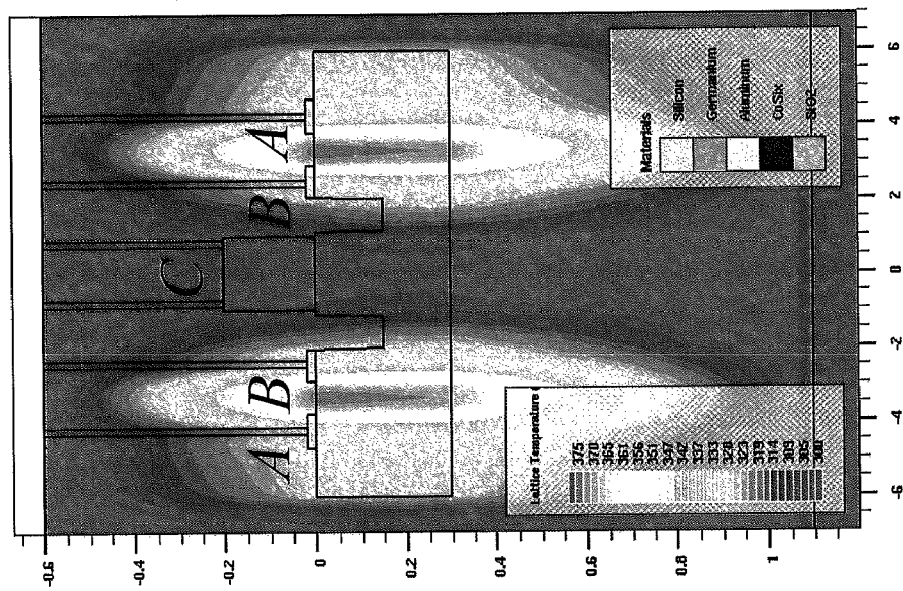

FIGS. 18a and 18b illustrate geometry (b).

Figure 19:
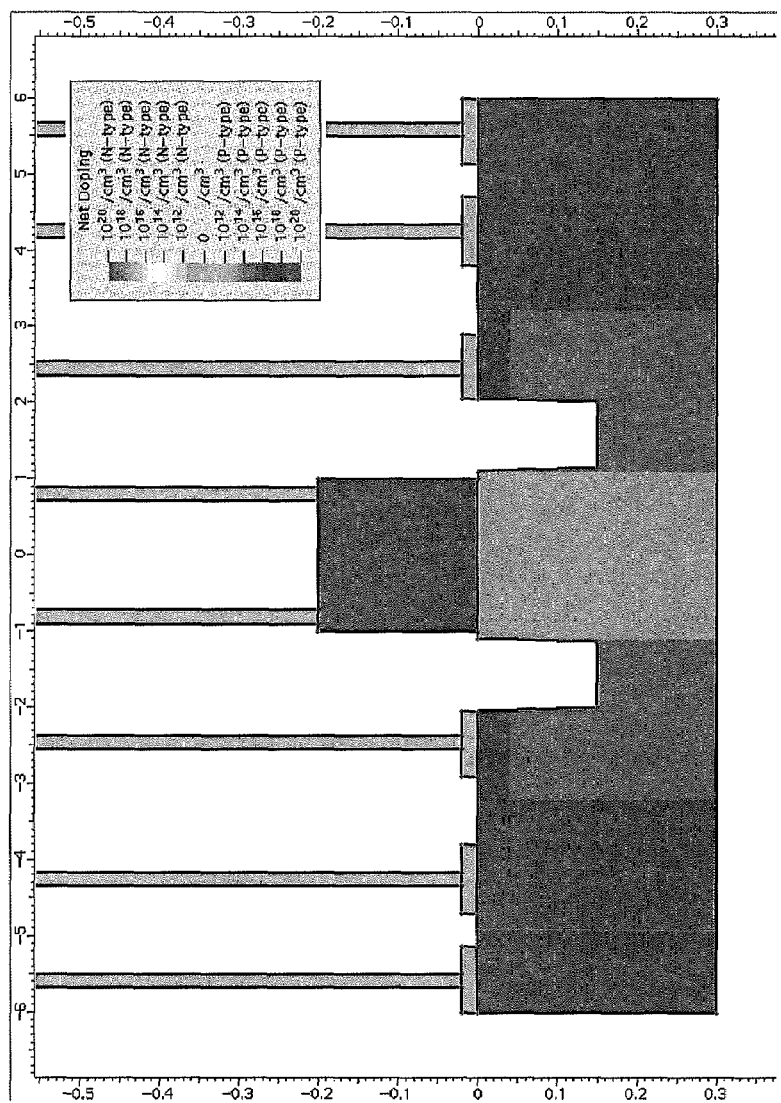

FIG. 19 illustrates geometry (c).

Figure 20:
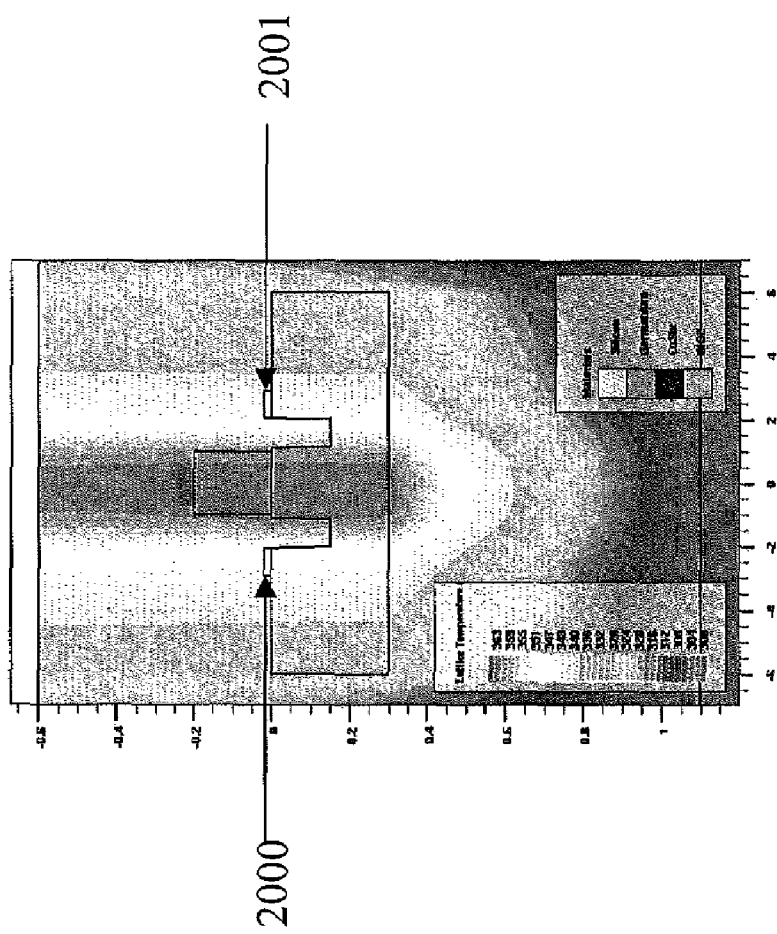

FIG. 20 illustrates a thermal distribution for geometry (a) for a WPD cross-section without electrodes.

Figures are not drawn to scale.

DETAILED DESCRIPTION

For the purposes of discussion, modes in photodiodes according to the current invention may be numbered (mode 1, mode 2, mode 3) in order according to increasing index and/or typed (type A, type B, type C) according to other properties. Mode 1 (mode type A) is the ground mode of the waveguide photodiodes. It has a single lobe, a high overlap with the germanium, and is well guided by the germanium stripe even in the absence of other structures in the silicon. Mode type B has a vertical lobe structure and a reduced overlap with germanium as compared with mode 1. Note that vertical refers to the direction normal to the wafer surface. In some cases, it may be only partially guided by the germanium stripe alone; for example, a type B mode may be a leaky mode in the absence of other structures such as, but not limited to, side-trenches. Mode type C has a mode overlap with germanium that is substantially higher than mode type B's overlap with germanium. Mode type C has a mode overlap with germanium that is substantially equal to mode type A's overlap with germanium, for cases where the waveguide photodiode is very wide. A type C mode has a horizontal mode structure.

I. Modal analysis of Germanium Waveguide Photodiodes

The designs disclosed in sections I to VI rely on the mode structure of the Germanium Waveguide Photodiodes (WPD). Thus we start by introducing this mode structure in the current section.

Figure 1:
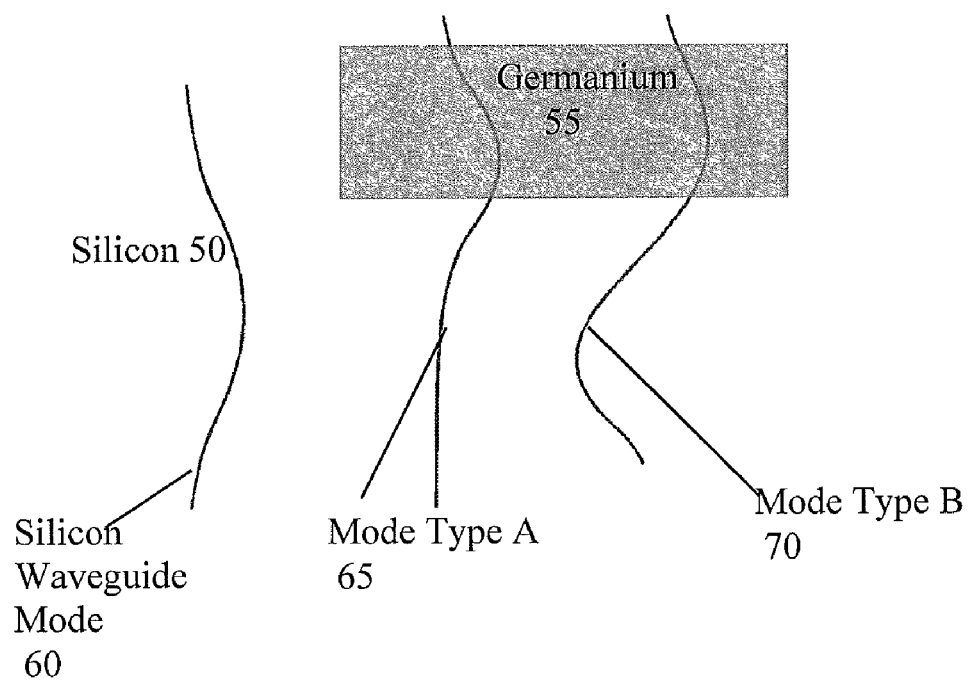
FIG. 1 is a schematic of the transition between the silicon region and the germanium region.

The common denominator of the disclosed structures is that germanium is deposited on top of the silicon active layer of a silicon on insulator (SOI) wafer, where the active layer is patterned to define photonic structures. Light is first guided in a silicon waveguide and is then transmitted into the region with Germanium. This transmission from the silicon region to the Germanium region (i.e., the region were Germanium is grown on top of the silicon film) can be assisted by a taper. However there is a fundamental mismatch between the silicon region and the germanium region due to their respective vertical structure (vertical refers to the direction normal to the wafer surface). This is illustrated in FIG. 1. FIG. 1 is a schematic of the transition between the silicon region and the germanium region. Silicon is labeled 50 and germanium is labeled 55. The optical modes are from left to right: the silicon waveguide mode 60, the WPD mode type A (mode 1) 65 and the WPD mode type B (mode 2) 70.

In the absence of a mode matching mechanism such as an adiabatic taper at least two modes are generally excited in the germanium region: The 1st mode that is generally well confined in the germanium, as well as at least one other mode that has two vertical lobes (such as modes with mode type B characteristics). This is constrained by the field continuity equations at the interface. The structure can be viewed as a multi-mode interferometer (MMI). This other mode will be referred to as mode 2 (a type B mode) in the following, as verifies very similar properties in all the disclosed structures. The presence of a type B mode (mode 2) constrains designs in many ways:

A type B mode (mode 2) is leaky in the simplest geometry (a germanium stripe on top of unpatterned silicon). Thus extra confinement has to be provided in the form of side-trenches etched into the silicon (section II).

A type B mode (mode 2) has a smaller overlap with germanium than mode 1 (which is mode type A). Its absorption rate by germanium is thus smaller. For this reason it takes a longer WPD to absorb a type B mode (mode 2) than to absorb mode a type A mode (mode 1) (leading to larger dark current and larger capacitance). Also, in the presence of other loss mechanisms such as silicide absorption, scattering by electrodes and side walls etc... a smaller portion of a type B mode (mode 2) is absorbed by germanium and a larger portion lost by the other loss mechanisms as compared to a type A mode (mode 1). For these reasons it is beneficial to couple more power into mode a type A mode (mode 1) and less into a type B mode (mode 2). This can be obtained by etching into the silicon below the germanium, prior to germanium growth. As the etching process used to open the dielectric windows for selective germanium growth is non-selective, this can be obtained without additional processing steps (section III).

The beating between a type A mode and a type B mode (modes 1 and 2 respectively) leads light to couple from the silicon into the germanium, from the germanium back into the silicon etc... (MMI effect). Thus there are field minima in the germanium at periodic intervals (~every 2 microns). Placing electrodes at these positions minimizes the scattering losses caused by the electrodes (section IV).

It is beneficial to have very small photodiodes, mostly because this reduces the dark current and the capacitance of the photodiodes and thus the achievable overall sensitivity of the receiver. However, small devices (of the order of 10 microns long) suffer from reduced responsivity, because a significant fraction of the light does not get absorbed and is lost at the end of the device. This can be alleviated by adding a reflector at the end of the WPD, or by integrating the WPD into a resonator. In all those cases it is however necessary to transfer the light from the WPD back into the silicon waveguide. By choosing the WPD length to be an integer time the beating length of modes 1 and 2 (a type A mode and a type B mode, respectively), the losses at the germanium region to silicon region interface can be minimized (section V).

Tapers for better mode conversion from the silicon region to the germanium region are difficult to implement. Due to the selective growth method very sharp features that are necessary at the onset of an adiabatic taper cannot be fabricated. Another difficulty lies in the fact that there is no space for electrodes on the germanium in the narrow regions of the taper. As some of the best designs in terms of dark current and capacitance necessitate electrodes contacting directly to the germanium, this is very problematic. We utilize specifics of the modal structure of the WPD to implement tapers that start with an acceptable width (~850 nm) and still yield very high conversion of the initial mode into modes highly confined in the germanium (section VI).

Two sections address designs that are independent of the above mentioned mode structure. Very compact photodiodes can be achieved by integrating them into micro-disks. These are disclosed in section VII.

Heating up germanium reduces its band-gap. This has two benefits: At a given wavelength the germanium absorption is enhanced. Also, the wavelength cut-off of the germanium absorption is shifted to smaller wavelengths. In section VIII we disclose how heaters can be incorporated into WPDs.

II. Side-trenches

Figure 2:
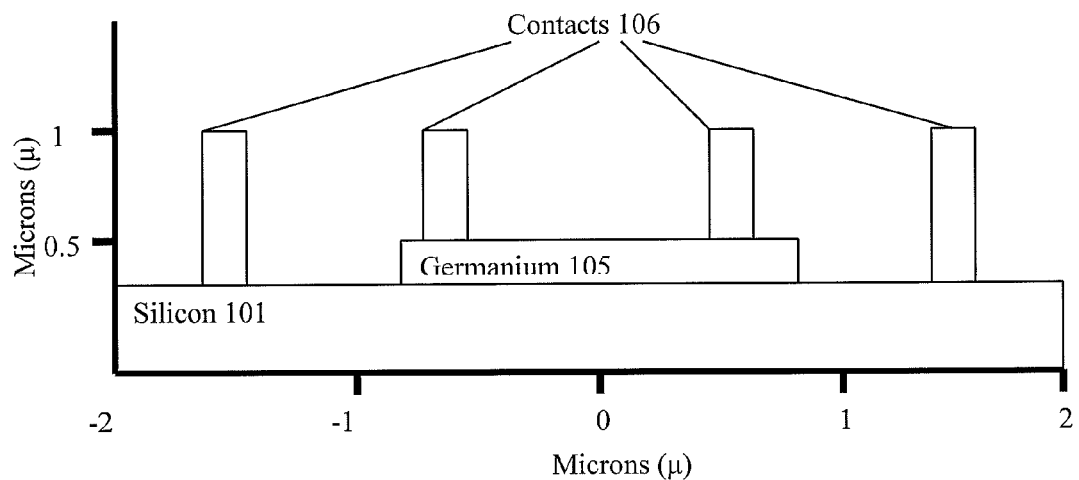
FIG. 2 shows the cross-section of a WPD perpendicular to the light propagation path, where the light is guided due to the presence of the germanium strip on top of the silicon film.
Figure 3A:
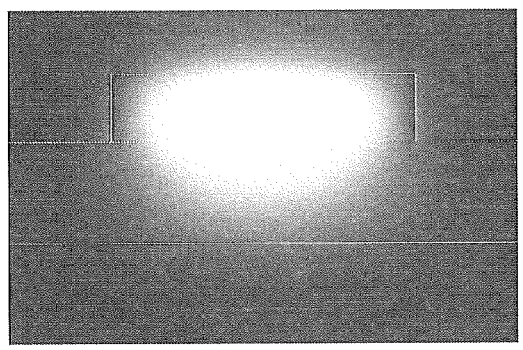
FIG. 3a represents Mode 1 (a type A mode) of the WPD shown in FIG. 2.
Figure 3B:
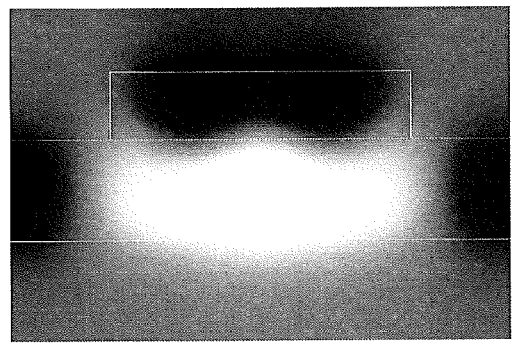
FIG. 3b represents Mode 2 (a type B mode) of the WPD shown in FIG. 2.

FIG. 2 shows the cross-section of a WPD perpendicular (x-y plane) to the light propagation path, where the light is guided due to the presence of the germanium strip on top of the silicon film. FIGS. 3a and 3b show the corresponding modes. FIG. 2 is a cross-section of a WPD without side-trenches. Silicon is labeled 101, germanium is labeled 105, and the contacts are labeled 106. The silicon in the vicinity of the silicon-contacts is salicided, so that light that escapes the waveguide gets subsequently absorbed by the silicide. FIG. 3a represents a type A mode (Mode 1) and FIG. 3b represents a type B mode (mode 2) of the waveguide shown in FIG. 2. The two-lobe vertical structure of a type B mode (mode 2), can be clearly seen.

Figure 4:
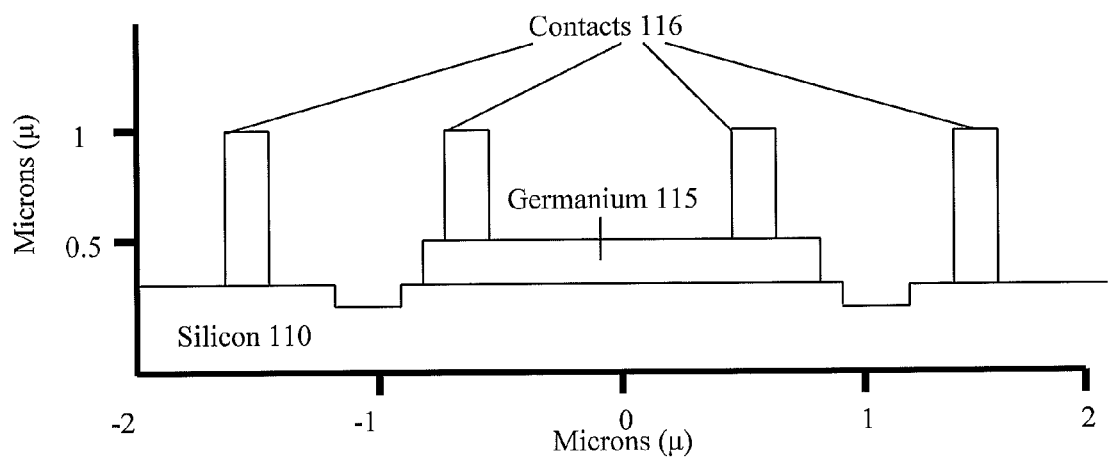
FIG. 4 illustrates a cross-section of a WPD with side-trenches.

While the type A mode, mode 1, is well confined and guided, the type B mode, mode 2, is actually a leaky mode. The light leaked by the type B mode (mode 2) is subsequently absorbed in the salicided region and lost. We evaluated the leakage rate to be 1700 $cm^{-1}$, which is very close to the germanium absorption rate of the type B mode (mode 2), so that only half of the power in the type B mode (mode 2), is absorbed by the germanium. The other half is lost to the salicide. In order to get a better responsivity, i.e., in order to completely absorb both the type A mode and the type B mode (modes 1 and 2) with germanium, an extra confinement mechanism has to be provided by etching trenches into the silicon on both sides of the germanium strip. The cross-section of such a waveguide is shown in FIG. 4. In this geometry the type B mode (mode 2) is non-leaky, as the effective index of the thinned slab (150 nm) is below the effective index of the type B mode (mode 2). In this particular implementation the total thickness of the silicon film 110 is 300 nm, the thickness of the germanium 115 is 200 nm and the width of the germanium strip 115 is 1500 nm. FIG. 4 illustrates a cross-section of a WPD with side-trenches. With this geometry, the type B mode (mode 2) is non-leaky.

III. Over-etch of the Dielectric Window Opening

Figure 5:
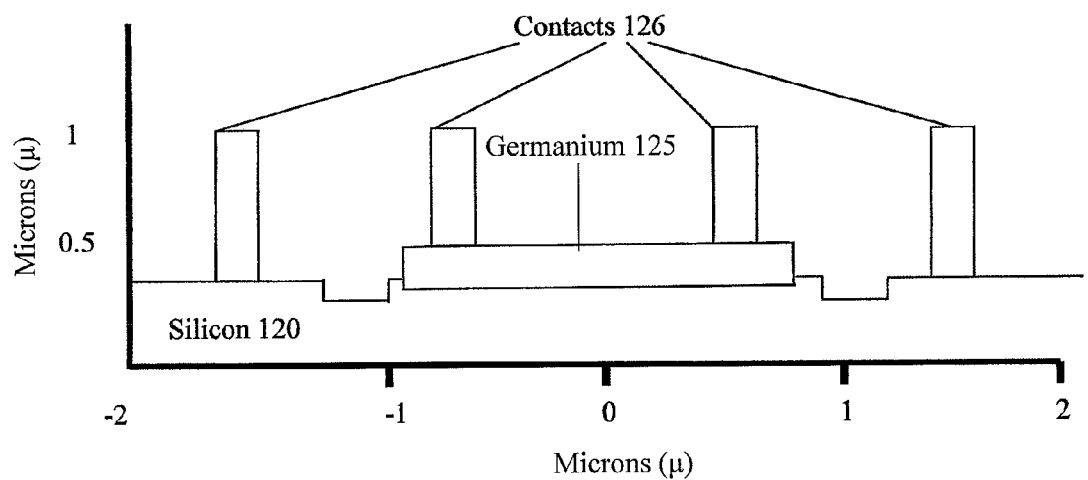
FIG. 5 illustrates a cross-section of a WPD with over-etch of the silicon layer in the dielectric window opening where the germanium is deposited.

As mentioned in section I, it is better to absorb the light over a short distance as this enables shorter devices with lower capacitance and dark current and with less losses due to competing loss mechanisms. This can be achieved by maximizing the amount of light coupled into a type A mode such as mode 1, as it has a higher overlap with the germanium. This can be achieved by "lowering" the germanium strip, so that the vertical mismatch between the silicon waveguide (silicon region) and the WPD (germanium region) is reduced. The cross-section of such a waveguide is shown in FIG. 5. FIG. 5 illustrates a cross-section of a WPD with over-etch of the dielectric window opening.

Selective growth of germanium is obtained by opening windows in the dielectric covering the silicon and subsequently growing the germanium. The germanium selectively nucleates on the silicon. This window opening etch step is not very selective to silicon, so that by over-etching a little a cross-section as in FIG. 5 can be obtained. Table 1 shows the coupling coefficients from the ground mode of a silicon ridge waveguide (1600 nm wide) into a type A mode (mode 1) of a WPD (1400 nm wide Germanium strip). The dependency on the silicon etch (inside the dielectric window) is very pronounced. Table 1 shows the dependency of the coupling coefficient from the Si waveguide into an A type mode (mode 1) of the WPD, as a well as of the confinement of an A type mode (mode 1) into the germanium, as a function of the dielectric window over-etch.

IV. Electrode Placement

The beating between mode 1 (a type A mode) and mode 2 (a type B or type C mode) corresponds to a coupling (within the WPD) back and forth from the silicon to the germanium. This beating is strongest at the beginning of the WPD where an A type mode (mode 1) and mode 2 (either type B or type C mode) are present with almost equal magnitude. Because mode 2 (either type B or type C mode) has a smaller overlap with germanium, and thus a smaller absorption coefficient, it becomes dominant towards the end of the WPD. Thus, the beating disappears at the end of the WPD. FIG. 6 shows the longitudinal cross-section of a simulated WPD, the beating can be clearly seen. FIG. 6 illustrates a field profile along the cross-section of a WPD. A silicon waveguide 130 is located to the left of the WPD (135 and 140 together). Inside the WPD, the light alternates between the silicon 135 and the germanium 140. The cross-section is taken along the y-z plane, where z is the direction of propagation and y is the normal to the wafer surface.

Electrodes contacting the germanium should be placed in the regions where the light is located in the silicon, so that it does not get absorbed or scattered by the electrodes. Corresponding field cross-sections are shown in FIG. 7. The beating length is typically of the order of 2 microns. FIG. 7 illustrates field cross-sections (a) where the field is in the germanium and (b) where the field is in the silicon. Electrodes are placed in region (b) and are represented by green rectangles. The cross-sections are taken along x-y planes.

Because there are actually more than 2 modes involved (considering only two modes is however a good first order approximation) and because the modes decay with different rates, the field profile has some more features as shown in FIG. 8. These can be used to further optimize electrode placement, by placing electrodes at the center or near the sides of the germanium strip. It is, however, beneficial to have two electrodes per (longitudinal) position along the WPD for reliability reasons. In any case these adjustments stay relatively minor, as the pitch of the electrodes stays close to a modal beating length. FIG. 8 illustrates the field profile at the top of the germanium strip. The periodicity of the beating profile can be clearly seen. Electrodes should be placed in the low field regions.

V. Integration of WPD into Photonic Structures

The size of a WPD can be reduced if the light passes several times through the WPD. The simplest way to achieve this is by placing a reflector at the end of the WPD, so that the transmitted light is reflected back and passes a second time through the WPD. The reflector can be implemented for example with a Sagnac loop. To implement this on chip it is however necessary to reinsert the light into a silicon waveguide at the end of the WPD. Here again the beating between mode 1 (type A mode) and mode 2 (either type B or type C mode) has to be taken into account. Indeed, if the length of the WPD is an integer time the beating length, the light at the end of the WPD will already be in the SOI film so that a silicon waveguide can be simply butt-coupled to the WPD. A WPD can also be integrated into a resonator, for example a ring/disk resonator or a Fabry-Perot resonator. FIGS. 9*a* and 9*b* show field cross-sections from the simulation of such a ring. In this case the length of the (curved) WPD is a single beating length. FIGS. 9*a* and 9*b* illustrate field cross-sections of a micro-disk (2-micron radius) with a germanium photodiode. The footprint of the disk is shown by line 900, the footprint of the germanium is also shown by a black line 905. FIG. 9*a* is the field cross-section in the silicon; FIG. 9*b* is the field cross-section in the germanium. It can be seen that the field first couples from the silicon into the germanium and then back into the silicon after a beating length. Coupling mechanisms to the disk (such as a critically coupled waveguide) and electrodes on the germanium and inside the disk are not represented in this schematic but are present in the physical device.

VI. Tapered WPD

In section III it was shown how the coupling ratio into mode 1 (mode type A) and mode 2 (mode type B or C) can be modified by changing the vertical structure of the WPD. Here, we use the degrees of freedom in the in-plane layout to achieve the same goal: More coupling into modes that have a high germanium overlap, so that the absorption occurs over a shorter length. This can be achieved with a long, adiabatic taper. This however is problematic: (a) Due to processing constraints it is very difficult to obtain the fine features associated with the onset of adiabatic tapers and (b) in the onset of the taper were the germanium strip is extremely narrow, it is not possible to place electrodes on top of the germanium. This will lead to reduced carrier collection efficiency and to a reduced WPD responsivity. These problems can be overcome by designing a taper with an initial width that is wide enough to accommodate electrodes from the beginning. However the vertical mismatch is already occurring so that both an A type mode (mode 1) and an equivalent of mode 2 (type C mode) are excited. Another property of the WPDs is used hereafter: There is always a second mode, "mode 2", that is excited (either a B type mode or a C type mode), and this "mode 2" always has the property of having two lobes in the vertical direction (a B type mode) or horizontal lobes (a C type mode), however the types of "mode 2" modes are not always the same number (i.e. don't have the same number when numbered in order of decreasing effective index) depending on the WPD width. This will be clarified below:

FIG. 10 shows the 3 relevant modes for a WPD with an 800 nm wide germanium strip (upper line) and a 1200 nm wide WPD (lower line). Arrows indicate how the modes are transformed when the waveguide width is widened from 800 to 1200 nm. It can be seen that mode 2 for the 800 nm waveguide (a type B mode) closely resembles mode 3 of the 1200 nm waveguide (also a type B mode). It turns out that when light is coupled from a silicon waveguide to an 800 nm WPD, it mostly excites an A type mode (mode 1) and a B type mode (mode 2), while when it is coupled to a 1200 nm WPD it mostly excites an A type mode (mode 1) and a B type mode (mode 3). This is quite intuitive given the mode structures.

FIG. 10 illustrates the relevant modes of a WPD with an 800 nm wide germanium strip (upper row) and of a WPD with a 1200 nm wide germanium strip (lower row). Arrows indicate the correspondence between the modes. For instance, mode n for the 800 nm WPD (mode 1=mode type A; mode 2=mode type B; mode 3=mode type C) is converted into mode n (n=1,2,3) for the 1200 nm WPD if the WPD is adiabatically tapered (mode 1=mode type A; mode 2=mode type C; mode 3=mode type B).

The dispersion diagram of modes 2 and 3 as a function of WPD width gives further insight into this mechanism (FIG. 11). Mode 2 and 3 anti-cross when the waveguide width is modified; this explains why their structure is exchanged from one to the other when the waveguide is widened. FIG. 11 illustrates the effective indices of modes 2 and 3 as a function of waveguide width (nm). Modes 2 and 3 "anti-cross" when the waveguide is broadened, in the vicinity of 950 nm width.

This is a useful phenomena because mode 2 is well confined in germanium for wide waveguides (1200 nm and wider, where it is a type C mode). Thus, the silicon waveguide can be butt-coupled to a narrower WPD (for example 800 nm) so that the light is coupled to mode 1 (a type A mode, well confined in germanium) and mode 2 (a type B mode at 800 nm WPD width). Subsequently the waveguide can be broadened so that both modes are well confined.

For the specific film thicknesses we are using, the critical region of the taper is around 900 nm to 950 nm widths, as it is in this region that the anti-crossing occurs. A specific example of such a taper geometry is given below: The Ge strip is widened from 800 to 850 nm over one micron WPD length, then from 850 nm to 1000 nm over 6 microns (half the widening rate) and finally widened from 1000 nm to 1200 nm over 4 microns (the widening rate is slowed down in the critical width region). The width of the WPD is kept constant once it reaches 1200 nm. FIG. 12 shows how much of the field has been absorbed when light has propagated over a given length through the taper. This curve is compared to absorption that would be obtained if all the power were contained in lo an A type mode (mode 1) and a B type mode (mode 2) from the beginning (the ideal case) and to the case of an untapered WPD. It appears that for a 12 micron long tapered WPD the efficiency of the ideal case is almost recovered. FIG. 12 illustrates a comparison of a tapered WPD (1201) with a non-tapered WPD (1202) and the ideal case of a WPD (1203) where all the power is coupled into mode 1 (a type A mode) at the beginning of the WPD. For a 12 micron long tapered WPD, the absorption almost reaches the efficiency of the ideal case.

VII. Micro-disk Germanium Photodiodes

In section V it has already been shown how WPDs can be incorporated into ring resonators or micro-disks. However, this technique necessitates reinsertion of light into silicon. Here we show a structure where this is not necessary. It is similar to the previous structure, but the photodiode goes around the entire circumference of the micro-disk. The germanium is contacted as shown in section IV, and the silicon is contacted inside the micro-disk. Light can be coupled by critical coupling or as in the device shown in FIG. 13. FIG. 13 illustrates a Micro-Disk Photodiode (MDP). Silicon is delimited by the black line 1301 (silicon inside the disk and inside the waveguide), germanium overgrowth is shown by area 1302 and contacts by squares 1303 and 1304.

At first sight this device seems quite simple, but careful design work is made to make it non-resonant. Indeed the device shown in FIGS. 9a and 9b is resonant, the WPD is small (~2 microns) so that light travels several times through it before being completely absorbed. As it is confined inside the disk, this leads to a resonance and limits the pass-band of the device. In the micro-disk photodiode (MDP) disclosed in this section a different concept is exploited.

To explain this we first have to take a step back: WPDs can't be made too narrow as surface effects and electrode scattering and absorption then limits their efficiency. Thus our WPD designs are usually multi-mode. This can then be exploited to pass a second time through the photodiode in the disk geometry without activating a resonance. FIG. 14 shows two modes of the micro-disk, one of which corresponds to the ground mode of the cylindrical system, the other having a second radial lobe. FIGS. 14a and 14b illustrate two modes of the micro-disk. FIG. 14a is the ground mode of the curved waveguide; FIG. 14b is the second mode, with a second radial lobe. The shading shows the field amplitude.

FIG. 15(a) shows the field (magnitude) where these two modes are degenerate. It can be seen that the field undergoes four beating lengths before circling around. This is a different beating length as the one previously addressed as it does not correspond to the "vertical problem", but to modes with a different in-plane structure. FIG. 15(b) shows the situation where the field undergoes N+½ beating lengths, where N is an integer (4 in this case). After looping back once the field is inside the disk rather than at its circumference. It doesn't interfere with the first loop, as it is now orthogonal to its original configuration. Of course this only works once, as light of the third loop-back interferes with the initial field (1st loop). However, for the geometry shown here the light is almost completely absorbed after two loops (>90%) so that the resulting resonance is very weak. This way the length of germanium can be shortened by two without compromising the pass-band of the device. Also, these devices have a significantly smaller footprint than the linear WPDs of similar germanium length. FIG. 15a illustrates the field in the micro-disk (magnitude) when the two modes shown in FIG. 14 undergo an integer number of beating lengths and FIG. 15b illustrates the field in the micro-disks when the two modes undergo N+½, N integer, number of beating lengths. There are also other phenomena occurring: Even if the field is close to the outer edge of the disk after looping back (for example the situation in FIG. 15a) it gets scattered into other micro-disk modes due to the presence of the waveguide (FIG. 16). The coupling scheme shown in FIG. 16b has very low ideality (as used in the critical coupling literature, i.e., it perturbs the disk a lot and induces inter-modal coupling) and is much preferable to critical coupling as it destroys resonances by providing a strong scatterer during loop back that scatters micro-disk modes into other micro-disk modes.

FIGS. 16a and 16b illustrate a comparison between a critically coupled MDP and a "butt-coupled" MDP. In the first case a single mode is excited that forms a resonance on looping back, while in FIG. 16b the waveguide junction has a very low ideality factor that induces inter-modal coupling and destroys or significantly weakens the resonance. This is desirable as a resonance reduces the pass-band of the device. This non-resonant loop-back mechanism only works well once, but light is almost completely absorbed in two turns.

VIII. Heated WPD

Heating up germanium reduces its bandgap, which (i) pushes the optical absorption edge of germanium toward longer wavelength and (ii) at a fixed wavelength enhances the absorption coefficient of germanium. As the WPD and the MDP are already integrated in a CMOS chip, it is possible to add a local heater with no overhead associated to chip manufacturing. In the case of the MDP a resistive element has to be added in the center of the disk. This resistive element can be isolated in a doped well of opposite doping than the surrounding silicon in order to keep it electrically isolated and to prevent compromising the responsivity of the receiver by adding additional noise sources.

Here we disclose three geometries for the WPD (a,b,c). They correspond to a trade-off in achievable temperature change per dissipated power versus electrical isolation. Indeed in configuration (a) the current passes directly below the germanium (in this configuration the germanium electrode has to be contacted to the transimpedance amplifier as it is the only one isolated from the heater current). The heat source is the closest to the germanium and has thus the highest possible efficiency, but the associated noise source has also the highest coupling to the germanium electrode. The heating current passes directly below the photodiode pn junction so that both voltage fluctuation and shot noise couple to this electrode. In (b) an additional electrode is added so that the current does not pass below the photodiode. Finally in (c) the heater element does not share any electrode with the photodiode and is isolated by an implant well, but it is also the farthest from the photodiode. These geometries and their associated thermal and current distributions are shown in FIGS. 17, 18 and 19. FIG. 17*a* illustrates an example geometry wherein electrodes B (1700 and 1701) are the anodes of the photodiode; electrodes A (1702) and C (1703) are both cathodes of the photodiode and electrodes of the heater. For example, B (1700 and 1701) could be at 0 V, A (1702) at 1 V and C (1703) at 3 V. This provides a reverse bias for the photodiode and a voltage drop for the heater. FIG. 17(*a*) shows the thermal distribution and FIG. 17(*b*) the current associated with the heater.

FIG. 18 illustrates geometry (b). Electrodes C (1800 and 1801) are the anodes of the WPD, electrodes B (1802 and 1803) the cathodes. Electrodes A (1804 and 1805)and B also provide the voltage drop for the heater. FIG. 18(*a*) shows the temperature distribution. It is strongly screened by the electrodes, so that the temperature change obtainable in the germanium region is limited. However as shown in FIG. 18(*b*) the current doesn't flow under the WPD anymore.

FIG. 19 illustrates geometry (c). Regions 1900 and 1901 show the n-type doping, while region 1903 shows the p-doping region. The heater is completely confined in the p-type silicon region and is electrically isolated from the photodiode. The capacitance associated to the silicon pn junction is minimized to minimize capacitive coupling of noise from the heater to the photodiode, thus the low p-type doping of the p-well near the interface. The electrodes of the heater are shown very close for compactness of the schematic, in an actual device their distance is chosen to obtain the targeted heater resistance. This device features the best electrical noise isolation, but also the lowest temperature swing per dissipated power. The latter is due to the fact that the heater is farther from the germanium than in the other designs.

The electrodes contacting the photodiode as well as the heater provide a high thermal conductivity path for the generated heat to escape and they limit the obtainable temperature change. Their effect on the thermal circuit should thus be minimized. FIG. 20 shows a WPD cross-section taken halfway from the z-positions where electrodes are located. FIG. 20 illustrates a thermal distribution for geometry (a) for a WPD cross-section without electrodes. The rectangles indicated with the arrows 2000 and 2001 are high conductivity silicide stripes that transport the voltage of electrodes A (1702) and C (1703) (FIG. 17). This way, at this location, the voltage for the heater is available without the heat sink induced by the via-electrodes. The same silicide stripes can be implemented with geometries (b) and (c).

Foregoing descriptions of specific embodiments of the invention have been presented for purposes of illustration and description. They are not intended to be exhaustive or to limit the invention to the precise forms disclosed. Modifications and variations are possible in light of the above teaching.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

We claim:

1. An integrated waveguide photodiode system comprising:
    a silicon waveguide formed from the top silicon layer of a silicon-on-insulator (SOI) substrate;
    an integrated waveguide photodiode, disposed on the substrate and optically coupled to the silicon waveguide wherein the integrated waveguide photodiode comprises:
        a silicon layer comprising substantially silicon, formed from the top silicon layer of a silicon-on-insulator (SOI) substrate, at least partially contiguous with the silicon waveguide; and
        a germanium layer comprising substantially germanium for conducting light, disposed on top of the silicon layer; and,
        at least one electrode comprising at least one contact in electrical contact with the germanium layer, positioned in proximity to predicted low optical field regions in the region of the top surface of the germanium layer, thereby reducing optical losses associated with the contacts,
    wherein the predicted low optical field regions are based on two dominant modes of the integrated waveguide photodiode substantially coupled to under operational conditions.

2. The integrated waveguide photodiode system of claim 1 wherein the SOI substrate comprises an SOI substrate selected from the list of:
    SSOI (strained silicon-on-insulator) and SOS (silicon on sapphire).

3. The integrated waveguide photodiode system of claim 1 further comprising:
    a transistor body disposed on the SOI substrate.

4. The integrated waveguide photodiode system of claim 1 wherein
    the predicted low optical field regions are at least in part based on
        effective indices of at least the two dominant modes of the integrated waveguide photodiode substantially coupled to under operational conditions and
        the coupling coefficients from the silicon waveguide into the integrated waveguide photodiode.

5. The integrated waveguide photodiode system of claim 1 wherein:
    the contacts are positioned in proximity to predicted low optical field regions in the region of the top surface of the germanium layer, thereby reducing optical scattering losses associated with the contacts.

6. The integrated waveguide photodiode system of claim 1 wherein:
    the contacts are positioned in proximity to predicted low optical field regions in the region of the top surface of the germanium layer, thereby reducing optical absorption losses associated with the contacts.

7. The integrated waveguide photodiode system of claim 1 wherein:
the germanium layer has substantially constant thickness.

8. The integrated waveguide photodiode system of claim 1 wherein:
the germanium layer is grown using a selective growth method.

9. The integrated waveguide photodiode system of claim 1 wherein:
two or more redundant contacts are positioned at substantially the same longitudinal position.

10. The integrated waveguide photodiode system of claim 1 wherein:
the electrode comprises at least one element selected from the list of:
an anode or a cathode.

11. The integrated waveguide photodiode system of claim 1 wherein:
at least some portion of the germanium layer is tapered and;
at least one electrode comprising at least one contact is positioned in proximity to the onset of the taper.

12. The integrated waveguide photodiode system of claim 1 wherein
the predicted low optical field regions are further based on and
two or more contacts positioned periodically in the longitudinal direction with a periodicity corresponding substantially to a beating length of the two dominant modes.

13. The integrated waveguide photodiode system of claim 1 wherein
the predicted low optical field regions are further based on
two or more contacts positioned with a longitudinal spacing corresponding substantially to a beating length of the two dominant modes.

14. The integrated waveguide photodiode system of claim 1 wherein
the predicted low optical field regions are further based on
a changing cross-section of the waveguide photodiode at different longitudinal positions,
effective indices of the two dominant modes varying along the integrated waveguide photodiode, and,
three or more contacts positioned with unequal spacing in the longitudinal direction corresponding substantially to a beating length of the two dominant modes.

15. The integrated waveguide photodiode system of claim 1,
wherein beating between the two dominant modes causes the light to alternate between the silicon layer and the germanium layer as the light moves in the longitudinal direction in the integrated waveguide photodiode, and
wherein two or more contacts are positioned in the longitudinal direction at positions corresponding substantially to a beating length of the two dominant modes, in regions where the light is substantially in the silicon layer for operational conditions.

16. The integrated waveguide photodiode system of claim 1,
wherein beating between the two dominant modes causes the lateral position of the low optical field regions to change along a length of the integrated waveguide photodiode, the lateral positions comprising:
a central position wherein a low optical field is disposed substantially in the center of a width of the integrated waveguide photodiode, in proximity to the region of the top surface of the germanium layer; and,
a peripheral position wherein low optical fields are disposed substantially along each side edge of the integrated waveguide photodiode, in proximity to the region of the top surface of the germanium layer;
wherein at least one contact is positioned in proximity to a low optical field region associated with a peripheral position.

17. The integrated waveguide photodiode system of claim 1,
wherein beating between the two dominant modes causes the lateral position of the low optical field regions to change along a length of the integrated waveguide photodiode, the lateral positions comprising:
a central position wherein a low optical field is disposed substantially in the center of a width of the integrated waveguide photodiode, in proximity to the region of the top surface of the germanium layer; and,
a peripheral position wherein low optical fields are disposed substantially along each side edge of the integrated waveguide photodiode, in proximity to the region of the top surface of the germanium layer;
wherein at least one contact is positioned in proximity to a central position.

18. The integrated waveguide photodiode system of claim 1 further comprising:
a second silicon waveguide formed from the top silicon layer of a silicon-on-insulator (SOI) substrate, and coupled to the second end of the integrated waveguide photodiode.

19. The process of designing an integrated waveguide photodiode system, the process comprising the steps of:
selecting an integrated waveguide photodiode system comprising:
a silicon waveguide formed from the top silicon layer of a silicon-on-insulator (SOI) substrate; and,
an integrated waveguide photodiode, disposed on the substrate and optically coupled to the silicon waveguide wherein the integrated waveguide photodiode comprises:
a silicon layer comprising substantially silicon, formed from the top silicon layer of a silicon-on-insulator (SOI) substrate, at least partially contiguous with the silicon waveguide; and
a germanium layer comprising substantially germanium for conducting light, disposed on top of the silicon layer;
predicting low optical field regions at the top surface of the germanium layer; and,
configuring the position of at least one electrode comprising at least one contact in electrical contact with the germanium layer, in proximity to predicted low optical field regions at the top surface of the germanium layer, thereby reducing optical losses associated with the contacts,
wherein at least some portion of the germanium layer is tapered, and
wherein at least one electrode comprising at least one contact is positioned in proximity to the onset of the taper.

20. An integrated waveguide photodiode system comprising:
a silicon waveguide formed from the top silicon layer of a silicon-on-insulator (SOI) substrate;
an integrated waveguide photodiode, disposed on the substrate and optically coupled to the silicon waveguide wherein the integrated waveguide photodiode comprises:

a silicon layer comprising substantially silicon, formed from the top silicon layer of a silicon-on-insulator (SOI) substrate, at least partially contiguous with the silicon waveguide; and a germanium layer comprising substantially germanium for conducting light, disposed on top of the silicon layer, the germanium layer comprising at least one tapered portion wherein:

the configuration of the silicon waveguide and the integrated waveguide photodiode is predicted to couple light from the silicon waveguide into at least two predominant modes of the integrated waveguide photodiode, the two dominant modes comprising:

a ground mode corresponding to the mode with highest refractive index of modes of the integrated waveguide photodiode; and, a second mode with a germanium overlap which improves for germanium layers wider than a characteristic width;

wherein:

the initial width of the taper is chosen to be smaller than the characteristic width.

21. The integrated waveguide photodiode system of claim 20 wherein:

the SOI substrate comprises an SOI substrate selected from the list of:

SSOI (strained silicon-on-insulator) and SOS (silicon on sapphire).

22. The integrated waveguide photodiode system of claim 20 wherein:

an intermediate taper width wider than the characteristic width is selected to support the improvement of the germanium overlap and germanium confinement profile.

23. The integrated waveguide photodiode system of claim 20 wherein:

one or more dimensions of the tapered portion are selected, at least in part, to support the improvement of the germanium overlap and germanium confinement profile, the dimensions selected from the list comprising:

the overall length of the tapered portion and the taper grade.

24. The integrated waveguide photodiode system of claim 20 wherein:

the ground mode comprises a single lobed mode with high germanium overlap and good lateral confinement characteristics in the germanium layer.

25. The integrated waveguide photodiode system of claim 20 wherein:

in the region of the onset of the tapered portion, the second mode comprises a mode with a vertical lobe structure and less overlap with the germanium layer than the ground mode.

26. The integrated waveguide photodiode system of claim 25 wherein:

in the region of the onset of the tapered portion, the second mode comprises a mode with a horizontal lobe structure.

27. The integrated waveguide photodiode system of claim 25 wherein:

the germanium layer further comprises a non-tapered portion.

28. The integrated waveguide photodiode system of claim 27 wherein:

in the region of the onset of the tapered portion, the second mode comprises a mode with a horizontal lobe structure.

29. The integrated waveguide photodiode system of claim 20 wherein:

less than eighty percent of the optical power is predicted to be coupled into the ground mode of the integrated waveguide photodiode system when under operation.

30. The integrated waveguide photodiode system of claim 20 wherein:

more than twenty percent of the optical power is predicted to be coupled into the second mode when under operation.

31. The integrated waveguide photodiode system of claim 20 further comprising:

a transistor body disposed on the SOI substrate.

32. The integrated waveguide photodiode system of claim 20 wherein:

the germanium layer has substantially constant thickness.

33. The integrated waveguide photodiode system of claim 20 wherein:

the germanium layer is grown using a selective growth method.

34. The integrated waveguide photodiode system of claim 20 wherein:

the initial width of the tapered portion is large enough to accommodate a contact to the germanium layer.

35. The integrated waveguide photodiode system of claim 20 wherein:

the integrated waveguide photodiode further comprises:

a second silicon waveguide formed from the top silicon layer of a silicon-on-insulator (SOI) substrate, and coupled to the second end of the integrated waveguide photodiode.

36. The integrated waveguide photodiode system of claim 35 wherein:

the germanium layer comprises at least a second tapered portion disposed in proximity to the second end of the germanium layer.

37. The integrated waveguide photodiode system of claim 35 wherein:

the germanium layer comprises at least a second tapered portion disposed at the second end of the germanium layer.

38. A method for designing an improved integrated waveguide photodiode system comprising the steps of:

selecting an integrated waveguide photodiode system comprising:

a silicon waveguide formed from the top silicon layer of a silicon-on-insulator (SOI) substrate; and, an integrated waveguide photodiode, disposed on the substrate and optically coupled to the silicon waveguide wherein the integrated waveguide photodiode comprises:

a silicon layer comprising substantially silicon, formed from the top silicon layer of a silicon-on-insulator (SOI) substrate, at least partially contiguous with the silicon waveguide; and a germanium layer comprising substantially germanium for conducting light, disposed on top of the silicon layer;

designing the shape of the germanium layer, wherein the shape of the germanium layer comprises a tapered portion and wherein the silicon waveguide is coupled to the integrated waveguide photodiode in the region of the tapered portion, the step of designing comprising the step of:

selecting the initial width of the tapered portion germanium layer, at least in part, to excite at least two predominant modes when under operation, the two predominant modes comprising:
 a ground mode corresponding to the mode with highest refractive index of modes of the integrated waveguide photodiode; and,
 a second mode with a germanium overlap which improves for germanium layers wider than a characteristic width.

* * * * *